(12) United States Patent
Santiago et al.

(10) Patent No.: US 8,328,516 B2
(45) Date of Patent: Dec. 11, 2012

(54) SYSTEMS AND METHODS OF ASSEMBLING A ROTOR BLADE EXTENSION FOR USE IN A WIND TURBINE

(75) Inventors: Pedro Luis Benito Santiago, Rheine (DE); Eugenio Yegro Segovia, Madrid (ES)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 12/569,251

(22) Filed: Sep. 29, 2009

(65) Prior Publication Data

US 2011/0076149 A1    Mar. 31, 2011

(51) Int. Cl.
    *F03D 1/00* (2006.01)
(52) U.S. Cl. ......... 416/62; 416/88; 416/132 B; 416/209; 244/199.1; 244/199.2; 244/199.4; 9/889.1; 9/889.7
(58) Field of Classification Search ............ 416/62, 416/228, 231 B, 209, 87, 88, 132 B, 142; 244/199.4, 199.2, 199.1; 29/889.1, 889.7
See application file for complete search history.

(56) References Cited

U.S. PATENT DOCUMENTS

| | | | |
|---|---|---|---|
| 5,533,865 A | 7/1996 | Dassen et al. | |
| 6,398,502 B1 | 6/2002 | Wobben | |
| 6,729,846 B1 | 5/2004 | Wobben | |
| 7,059,833 B2 | 6/2006 | Stiesdal et al. | |
| 7,458,777 B2 | 12/2008 | Herr | |
| 7,540,716 B2 * | 6/2009 | Wobben | 416/228 |
| 7,690,895 B2 * | 4/2010 | Moroz | 416/132 B |
| 7,841,836 B2 * | 11/2010 | Wobben | 416/228 |
| 7,931,444 B2 * | 4/2011 | Godsk et al. | 416/228 |
| 8,029,241 B2 * | 10/2011 | McGrath et al. | 416/228 |
| 2007/0018049 A1 * | 1/2007 | Stuhr | 244/124 |
| 2007/0175134 A1 * | 8/2007 | Christenson | 52/292 |
| 2007/0253824 A1 * | 11/2007 | Eyb | 416/223 R |
| 2008/0080977 A1 | 4/2008 | Bonnet | |
| 2008/0240925 A1 * | 10/2008 | Kita et al. | 416/230 |
| 2008/0286110 A1 | 11/2008 | Gupta et al. | |
| 2008/0298967 A1 | 12/2008 | Matesanz Gil et al. | |
| 2009/0169390 A1 * | 7/2009 | Nies | 416/223 A |
| 2011/0020126 A1 * | 1/2011 | Glenn et al. | 416/223 A |
| 2011/0076149 A1 * | 3/2011 | Santiago et al. | 416/223 R |
| 2011/0081247 A1 * | 4/2011 | Hibbard | 416/226 |
| 2011/0081248 A1 * | 4/2011 | Hibbard | 416/226 |
| 2011/0142635 A1 * | 6/2011 | Fritz | 416/62 |
| 2011/0158788 A1 * | 6/2011 | Bech et al. | 415/1 |

FOREIGN PATENT DOCUMENTS

WO    WO 2008077403 A2 *    7/2008

* cited by examiner

*Primary Examiner* — Igor Kershteyn
*Assistant Examiner* — Christopher R Legendre
(74) *Attorney, Agent, or Firm* — James McGinness, Esq.; Armstrong Teasdale LLP

(57) ABSTRACT

A method of assembling a blade extension assembly for use with a wind turbine. The method includes removing a tip end of a tip portion of a rotor blade and coupling a tip wall to the tip portion. The tip wall extends between a first sidewall and a second sidewall and includes a plurality of slots defined therein. A blade extension assembly is coupled to the tip portion.

17 Claims, 7 Drawing Sheets

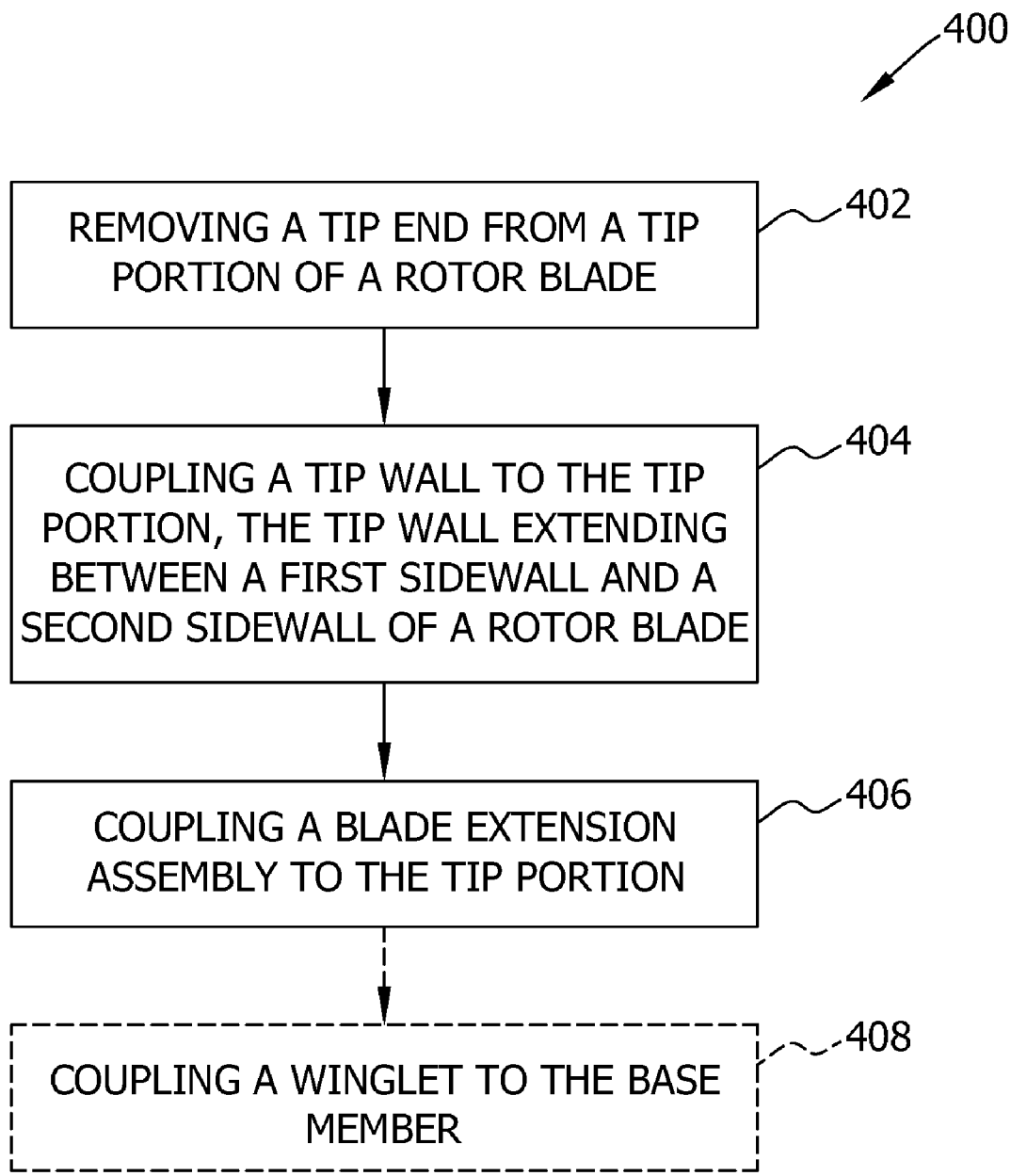

SYSTEMS AND METHODS OF ASSEMBLING A ROTOR BLADE EXTENSION FOR USE IN A WIND TURBINE

BACKGROUND OF THE INVENTION

The embodiments described herein relate generally to methods and systems for assembling a wind turbine including a blade extension, and more particularly, to systems and methods for assembling a blade extension assembly for use in a wind turbine.

At least some known wind turbine towers include a nacelle fixed atop a tower, wherein the nacelle includes a rotor coupled to a generator through a shaft. In known rotor assemblies, a plurality of blades extend from the rotor. The blades are oriented such that wind passing over the blades turns the rotor and rotates the shaft, thereby driving the generator to generate electricity.

As air passes over each blade, a pressure differential results on opposing sides of the blade, such that a higher pressure is generated on one side and a lower pressure is generated on the opposite side. Because of this pressure differential, air tends to curl around the blade tip to establish pressure equilibrium. The generation of vortices at the blade tip is facilitated by the air curling around the blade tip, and the flow of air over the blade combines with the vortices at the blade tip to generate a string of vortices that trail from the blade tip.

Blades with a high aerodynamic loading generate increased lift, and the increased lift tends to increase the efficiency of the blade. However, blades with increased loading also tend to have a greater surface area at the blade tip, which may contribute to stronger vortices being generated at the blade tip. The increased strength of the vortices and the interaction of each vortex with the blade surface can increase the noise generated by the turbine. Additionally, turbulent kinetic energy (TKE) at the blade tip increases pressure fluctuations that are responsible for noise generation. Moreover, when the flow of air separates from the blade tip, the blade surface area is "washed" by the resulting vortices, thereby generating additional noise.

BRIEF DESCRIPTION OF THE INVENTION

In one aspect, a method of assembling a blade extension assembly for use with a wind turbine is provided. The method includes removing a tip end of a tip portion of a rotor blade and coupling a tip wall to the tip portion. The tip wall extends between a first sidewall and a second sidewall and includes a plurality of slots defined therein. A blade extension assembly is coupled to the tip portion.

In another aspect, a blade extension assembly for use in a wind turbine is provided. The blade extension includes a tip wall adapted to be coupled to a tip portion of a rotor blade and a base member adapted to be coupled to the tip portion. The tip portion includes a blade outer surface. A plurality of support rods are coupled to and extend from the base member towards the tip portion. The support rods are coupled to the tip portion with a plurality of shear pins at least partially inserted therein.

In yet another aspect, a wind turbine is provided. The wind turbine includes a tower, a nacelle coupled to the tower, a hub rotatably coupled to the nacelle, and at least one rotor blade coupled to the hub. The rotor blade includes a tip portion and a blade outer surface. A blade extension assembly is coupled to the rotor blade. The blade extension assembly includes a tip wall coupled to the tip portion, a base member coupled to the tip portion, and a plurality of support bars coupled to and extending from the base member towards the tip portion. The support bars are coupled to the tip portion.

In yet another aspect, a rotor blade for use with a wind turbine is provided. The rotor blade includes a tip portion; and a blade extension assembly coupled to the tip portion. The blade extension assembly includes a tip wall coupled to the tip portion, a base member coupled to the tip portion, and a plurality of support bars coupled to and extending from the base member towards the tip portion. The support bars are coupled to the tip portion.

The embodiments described herein facilitate reducing noise generated at the tip portion of a rotor blade by the rotation of the rotor blade, and facilitate increasing the electrical power produced by a wind turbine. More specifically, the blade extension assembly described herein enables an increase in a length and blade surface area of an existing rotor blade, thereby facilitating an increase in the energy generated in a wind turbine. In addition, the blade extension assembly described herein facilitates modifying the vortices that trail from the rotor blade, thereby facilitating reduced levels of vortex turbulent kinetic energy (TKE), and facilitating reduced pressure fluctuations across the rotor blade surface that generate noise.

BRIEF DESCRIPTION OF THE DRAWINGS

FIGS. 1-7 show exemplary embodiments of the systems and method described herein.

FIG. 1 is a perspective view of an exemplary wind turbine.

FIG. 2 is an enlarged perspective view of the wind turbine shown in FIG. 1 including an exemplary blade extension assembly.

FIG. 3 is a perspective view of an exemplary blade extension assembly suitable for use with the wind turbine shown in FIG. 1.

FIG. 4 is a perspective view of a portion of an exemplary rotor blade suitable for use with the wind turbine shown in FIG. 1.

FIG. 5 is a cross-sectional view of an alternative blade extension assembly for use with the wind turbine shown in FIG. 1.

FIG. 6 is a cross-sectional view of an alternative embodiment of a blade extension assembly for use with the wind turbine shown in FIG. 1.

FIG. 7 is a flowchart of an exemplary method for assembling a blade extension assembly suitable for use with the wind turbine shown in FIG. 1.

DETAILED DESCRIPTION OF THE INVENTION

The embodiments described herein include a wind turbine system that enables an increase in wind turbine power production and a reduction in the generation of acoustic noise during operation of the wind turbine. The systems and methods described herein facilitate retrofitting an existing rotor blade to increase a length and surface area of the rotor blade. More specifically, the blade extension assembly described herein enables an existing rotor blade to be modified to facilitate reducing noise generated at the tip portion of a rotor blade by the rotation of the rotor blade, and facilitate increasing the electrical power produced by a wind turbine.

Figure 1:
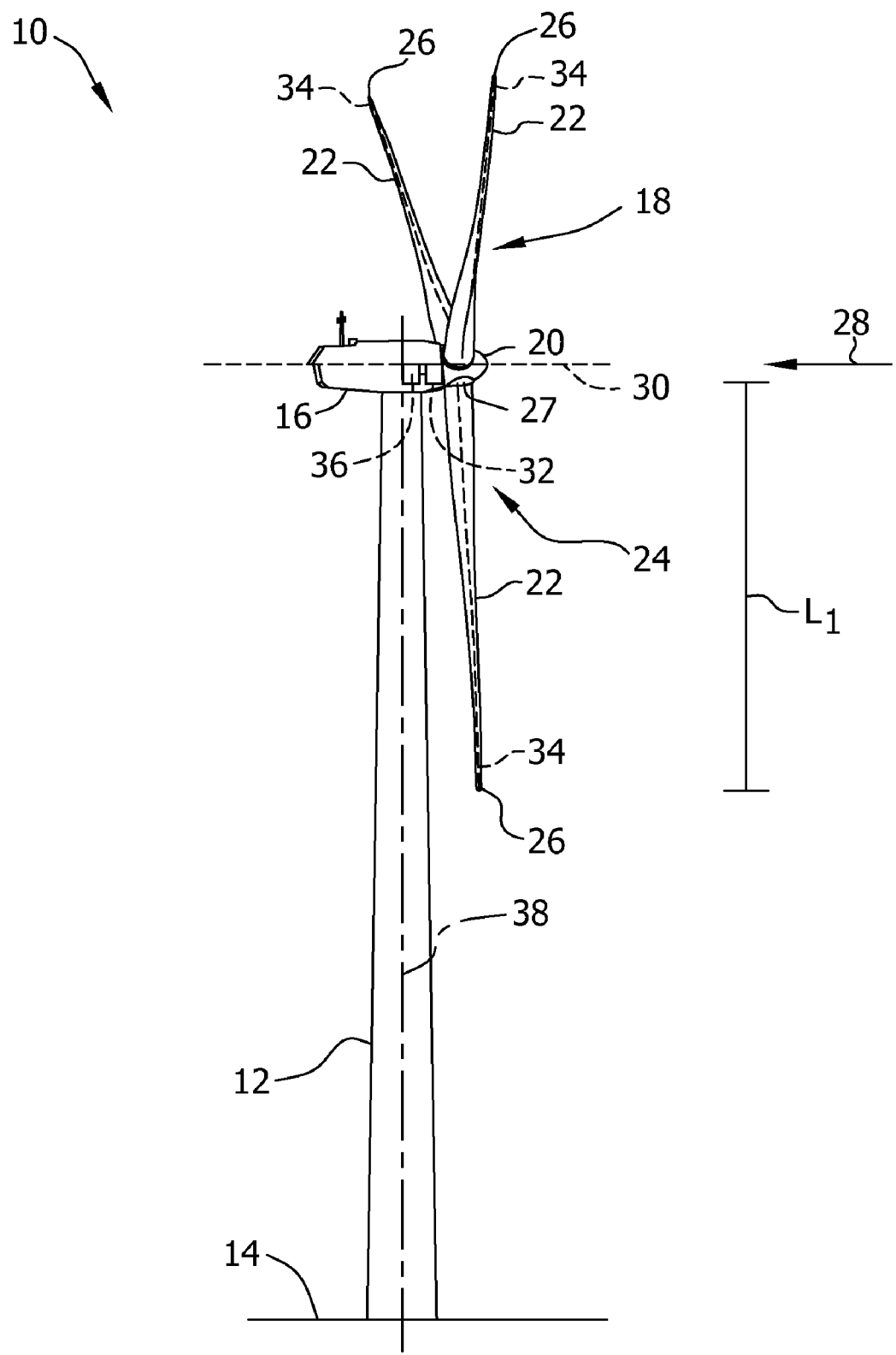
Figure 2:
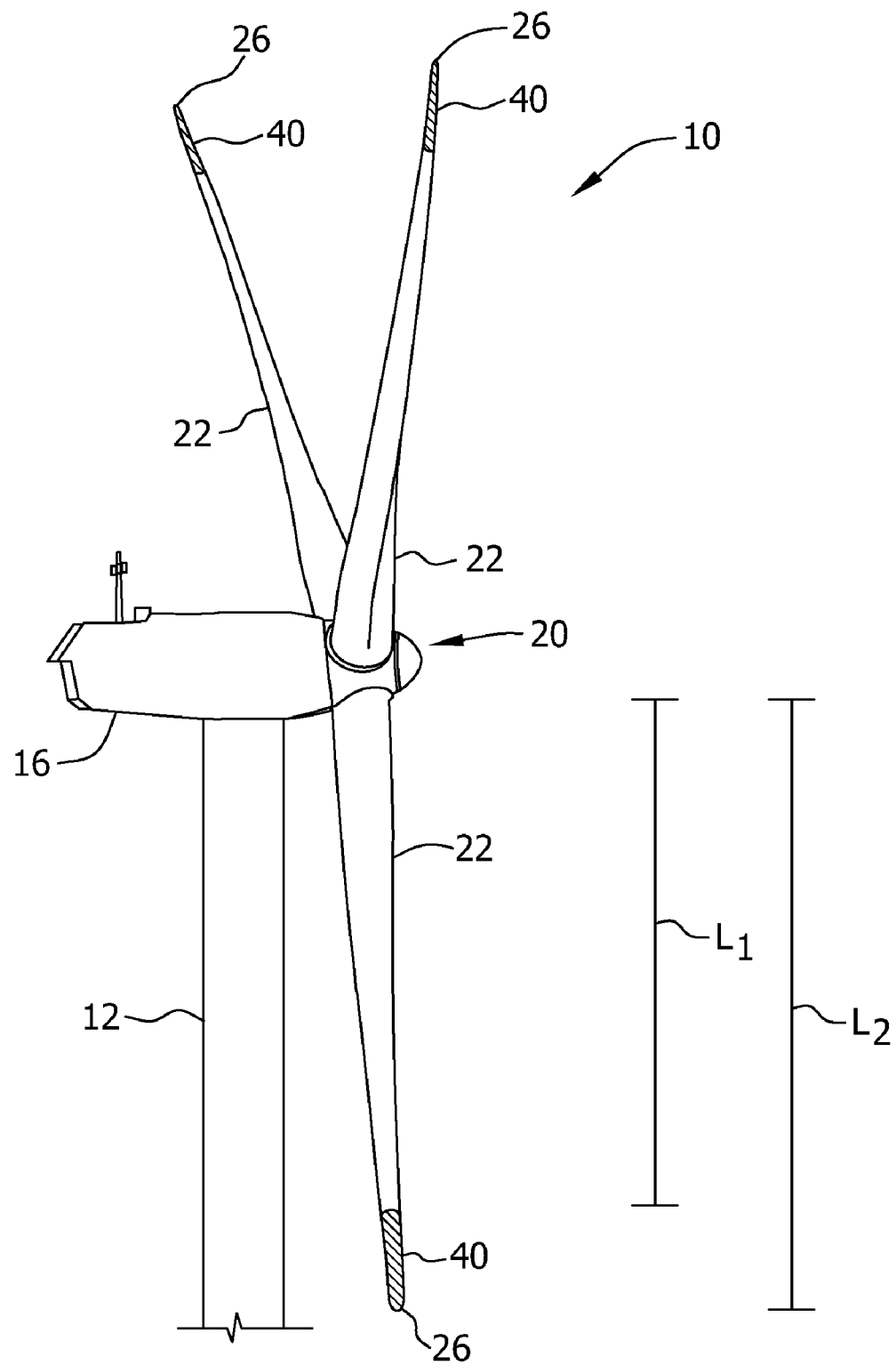

FIG. 1 is a perspective view of an exemplary wind turbine 10. FIG. 2 is an enlarged perspective view of an exemplary wind turbine 10. Components shown in FIG. 1 are labeled with similar reference numbers in FIG. 2. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 is selected based upon factors and conditions known in the art.

Rotor blades 22 are spaced about hub 20 to facilitate rotating rotor 18. Rotor blades 22 include a blade root 24 and a blade tip 26, and are mated to hub 20 by coupling blade root 24 to hub 20 at a plurality of load transfer regions 27. Load transfer regions 27 have a hub load transfer region and a blade load transfer region (both not shown in FIG. 1). Loads induced to rotor blades 22 are transferred to hub 20 by load transfer regions 27.

In the exemplary embodiment, rotor blades 22 have a length $L_1$ that extends from blade root 24 to blade tip 26. Length $L_1$ has a range from about 15 meters (m) to about 91 m. Alternatively, rotor blades 22 may have any suitable length that enables wind turbine 10 to function as described herein. For example, other non-limiting examples of blade lengths include 10 m or less, 20 m, and 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. A pitch adjustment system 32 rotates rotor blades 22 about a pitch axis 34 for adjusting an orientation of rotor blades 22 with respect to direction 28 of the wind. A speed of rotation of rotor 18 may be controlled by adjusting the orientation of at least one rotor blade 22 relative to wind vectors. In the exemplary embodiment, a pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

Wind turbine 10 also includes a blade extension assembly 40 coupled to each rotor blade 22. In the exemplary embodiment, wind turbine 10 includes three blade extension assemblies 40 that each correspond with a respective rotor blade 22. Alternatively, wind turbine 10 includes any number of blade extension assemblies 40 that correspond to the number of rotor blades 22 that enable wind turbine 10 to function as described herein. Blade extension assembly 40 is coupled to blade tip 26 and extends axially and/or radially outward from rotor blade 22.

Each rotor blade 22 includes a blade extension assembly 40. Alternatively, at least one rotor blade 22 includes a blade extension assembly 40. In the exemplary embodiment, each blade extension assembly 40 is substantially similar, however, at least one blade extension assembly 40 may be different than at least one other blade extension assembly 40. In the exemplary embodiment, blade extension assembly 40 is positioned proximate blade tip 26, such that rotor blade 22 and blade extension assembly 40 define a length $L_2$ that is greater than length $L_1$ of rotor blade 22.

Figure 3:
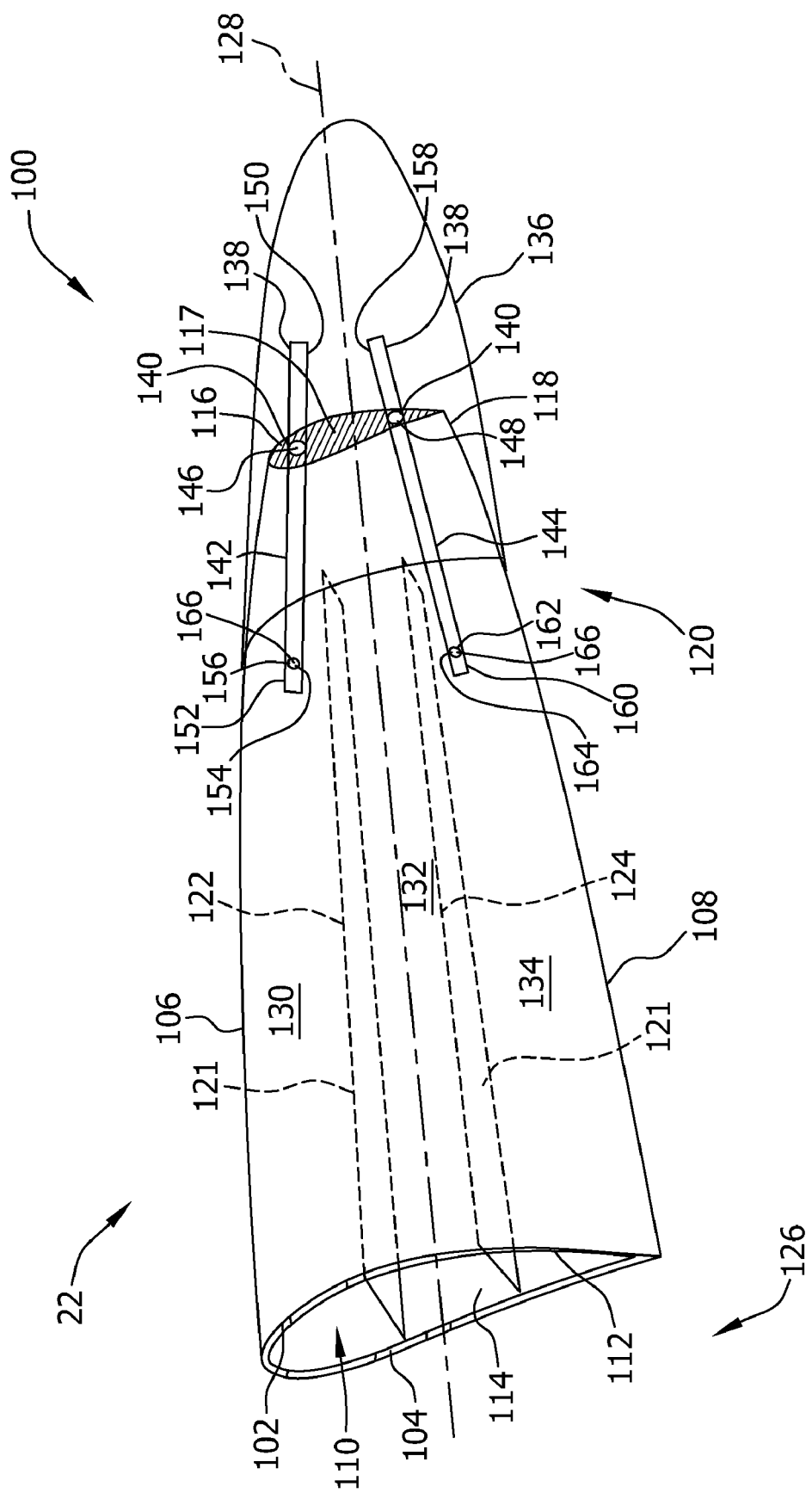

FIG. 3 is a perspective view of exemplary blade extension assembly 100 suitable for use with wind turbine 10. Components shown in FIG. 1 are labeled with similar reference numbers in FIG. 3. In the exemplary embodiment, rotor blades 22 are identical and each includes a first sidewall 102 and a cooperating second sidewall 104. Second sidewall 104 is coupled to first sidewall 102 along a leading edge 106 and along an axially-spaced trailing edge 108. First sidewall 102 and second sidewall 104 are coupled together to define a cavity 110 between first sidewall 102 and second sidewall 104. Specifically, cavity 110 is bordered at least in part by a first sidewall inner surface 112 and a second sidewall inner surface 114. A tip wall 116 is positioned at a tip end 118 of a blade tip portion 120. Tip wall 116 is coupled to first sidewall 102 and second sidewall 104 and extends between leading edge 106 and trailing edge 108. In the exemplary embodiment, tip wall 116 includes surface 117 that is substantially perpendicular to first sidewall 102 and second sidewall 104. In an alternative embodiment, tip wall 116 includes at least one of a concave and/or convex surface 117. In a further embodiment, tip wall 116 includes a convex surface 117. At least one spar 121 is positioned within cavity 110 and extends from a blade root portion 126 towards blade tip portion 120. In the exemplary embodiment, rotor blade 22 includes a forward, or first spar 122 and an aft, or second spar 124. In an alternative embodiment, rotor blade 22 includes any number of spars such that rotor blade 22 functions as described herein. First spar 122 is positioned within cavity 110 and extends from blade root portion 126 towards blade tip portion 120. First spar 122 is positioned between a centerline 128 and leading edge 106, such that a forward cavity 130 is defined between leading edge 106 and first spar 122. Second spar 124 is positioned within cavity 110 and extends from blade root portion 126 towards blade tip portion 120. Second spar 124 is positioned substantially parallel to first spar 122 and between centerline 128 and trailing edge 108. A center cavity 132 is defined between first spar 122 and second spar 124, and an aft cavity 134 is defined between second spar 124 and trailing edge 108. First spar 122 and second spar 124 extend between first sidewall 102 and second sidewall 104, are coupled to first sidewall 102 and second sidewall 104, and are configured to facilitate a reduction in a flexion and a deformation of rotor blade 22. In an alternative embodiment, rotor blade 22 includes only one spar 121 positioned within cavity 110. In a further embodiment, rotor blade 22 includes any number of spars 121 that enable rotor blade 22 to function as described herein.

In the exemplary embodiment, blade extension assembly 100 is coupled to blade tip portion 120. Blade extension assembly 100 includes a base member 136 and plurality of support rods 138. Support rods 138 extend outward from blade extension assembly 100 and are inserted into blade tip portion 120. In one embodiment, support rods 138 are formed unitarily with base member 136. Tip wall 116 includes a plurality of openings 140 sized and shaped to receive a corresponding support rod 138. In the exemplary embodiment, tip wall 116 includes two openings 140, however, it should be understood that tip wall 116 may include any number of openings 140 that correspond to the number of support rods 138. In the exemplary embodiment, blade extension assembly 100 includes a first, or forward support rod 142 and a second, or aft support rod 144. Forward support rod 142 is coupled to base member 136 and extends outward from base member 136 towards leading edge 106. Forward support rod 142 extends through a tip wall opening 146 and is positioned within forward cavity 130. Aft support rod 144 is coupled to base member 136 and extends outward from base member 136 through a tip wall opening 148 and is positioned within aft cavity 134. Forward support rod 142 includes a base end 150 and a tip end 152. Tip end 152 includes a forward support tip opening 154. First sidewall 102 includes a corresponding forward opening 156. Forward support rod 142 is positioned in forward cavity 130 such that forward opening 156 is concentrically aligned with forward support tip opening 154. Aft support rod 144 includes a base end 158 and a tip end 160. Tip end 160 includes an aft support tip opening 162. First sidewall 102 includes a corresponding aft opening 164. Aft support rod 144 is positioned within aft cavity 134 such that aft support tip opening 162 is concentrically aligned with aft opening 164. A plurality of fasteners, or shear pins 166 are inserted through forward opening 156, forward support tip opening 154, aft opening 164, and aft support tip opening 162, such that rotor blade 22 is fixedly coupled to blade extension assembly 100. In the exemplary embodiment, shear pins 166 extend at least partially through support rods 138. In an alternative embodiment, shear pins 166 extend entirely through support rods 138 such that shear pins 166 extend between first sidewall 102 and second sidewall 104. In a further embodiment, second sidewall 104 includes corresponding forward and aft openings 156 and 164, such that shear pins 166 extend from second sidewall 104 through support rods 138. In another embodiment, forward support rod 142 and/or aft support rod 144 are coupled to at least one spar 121.

Figure 4:
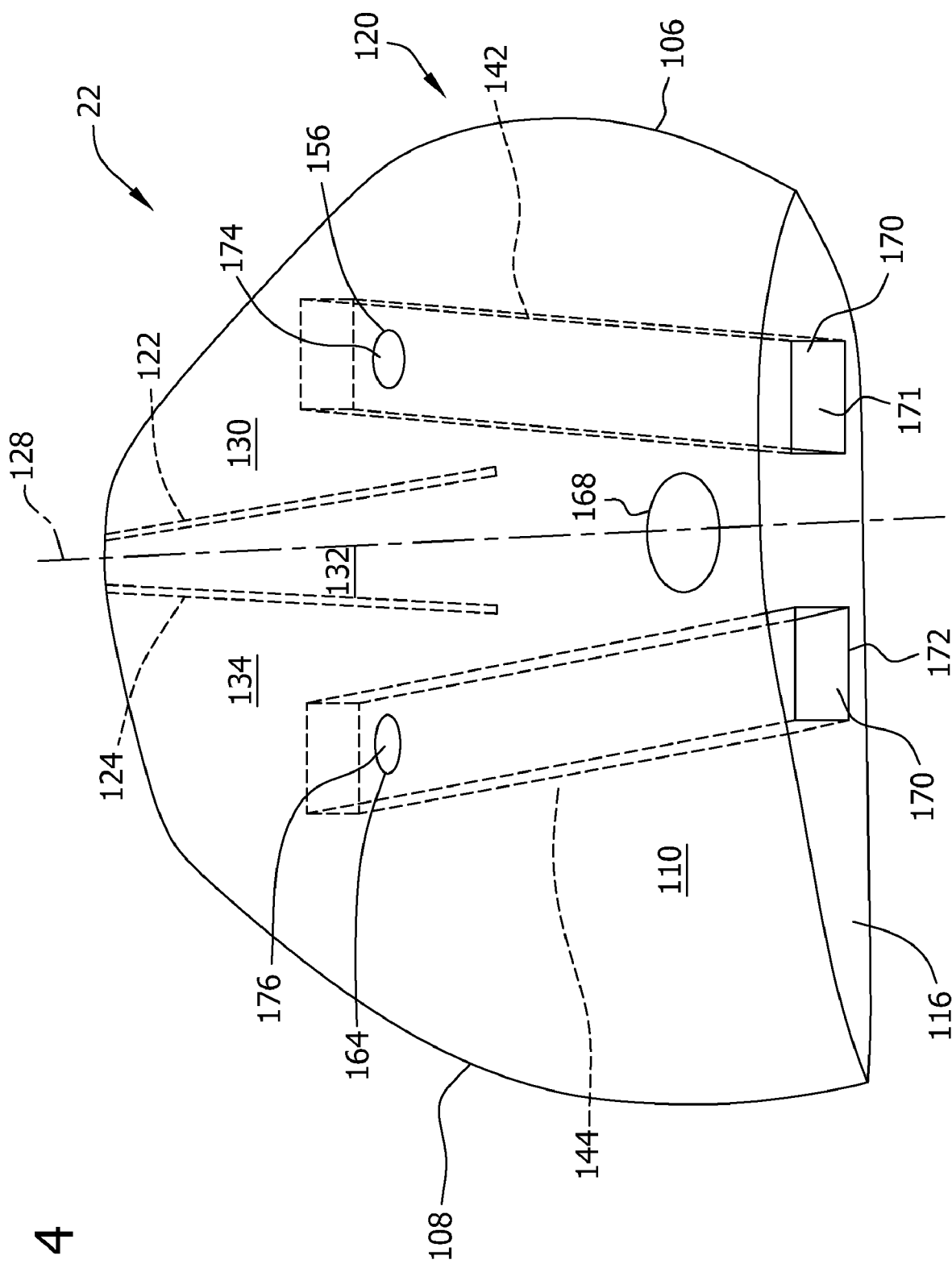

FIG. 4 is a perspective view of an exemplary rotor blade 22 suitable for use with wind turbine 10. Components shown in FIG. 4 that are also shown in FIG. 3 are labeled with similar reference numbers in FIG. 4. In the exemplary embodiment, rotor blade 22 includes a lightning receptor 168 positioned within blade tip portion 120. Tip wall 116 includes a plurality of slots 170 sized and shaped to receive support rods 138 therein. In the exemplary embodiment, tip wall 116 includes a forward slot 171 and an aft slot 172. Forward slot 171 is sized and shaped to receive forward support rod 142. Aft slot 172 is sized and shaped to receive aft support rod 144 therein. Forward support rod 142 extends inward through forward cavity 130 and is aligned obliquely from rotor blade centerline 128 towards leading edge 106. Forward opening 156 is positioned between forward spar 122 and leading edge 106, such that a forward shear pin 174 is inserted through forward opening 156 and extends into forward cavity 130. Aft opening 164 is defined through first sidewall 102 and is positioned between aft spar 124 and trailing edge 108, such that an aft shear pin 176 is inserted through aft opening 164 and extends into aft cavity 134. Aft support rod 144 extends inward through cavity 110 and is aligned obliquely from rotor blade centerline 128 towards trailing edge 108, such that aft support rod 144 extends through to aft cavity 134. Forward shear pin 174 is inserted through forward opening 156 and extends at least partially through forward support rod 142. Aft shear pin 176 is inserted through aft opening 164 and extends at least partially through aft support rod 144. In the exemplary embodiment, shear pins 174 and 176 are cylindrically-shaped. In an alternative embodiment, shear pins 174 and 176 are substantially rectangular-shaped. In the exemplary embodiment, shear pins 174 and 176 are fabricated from a non-conductive material, such as, for example, fiberglass, however, shear pins 174 and 176 may be fabricated from aluminum, steel, or any suitable material that enables blade extension assembly 100 to function as described herein.

Figure 5:
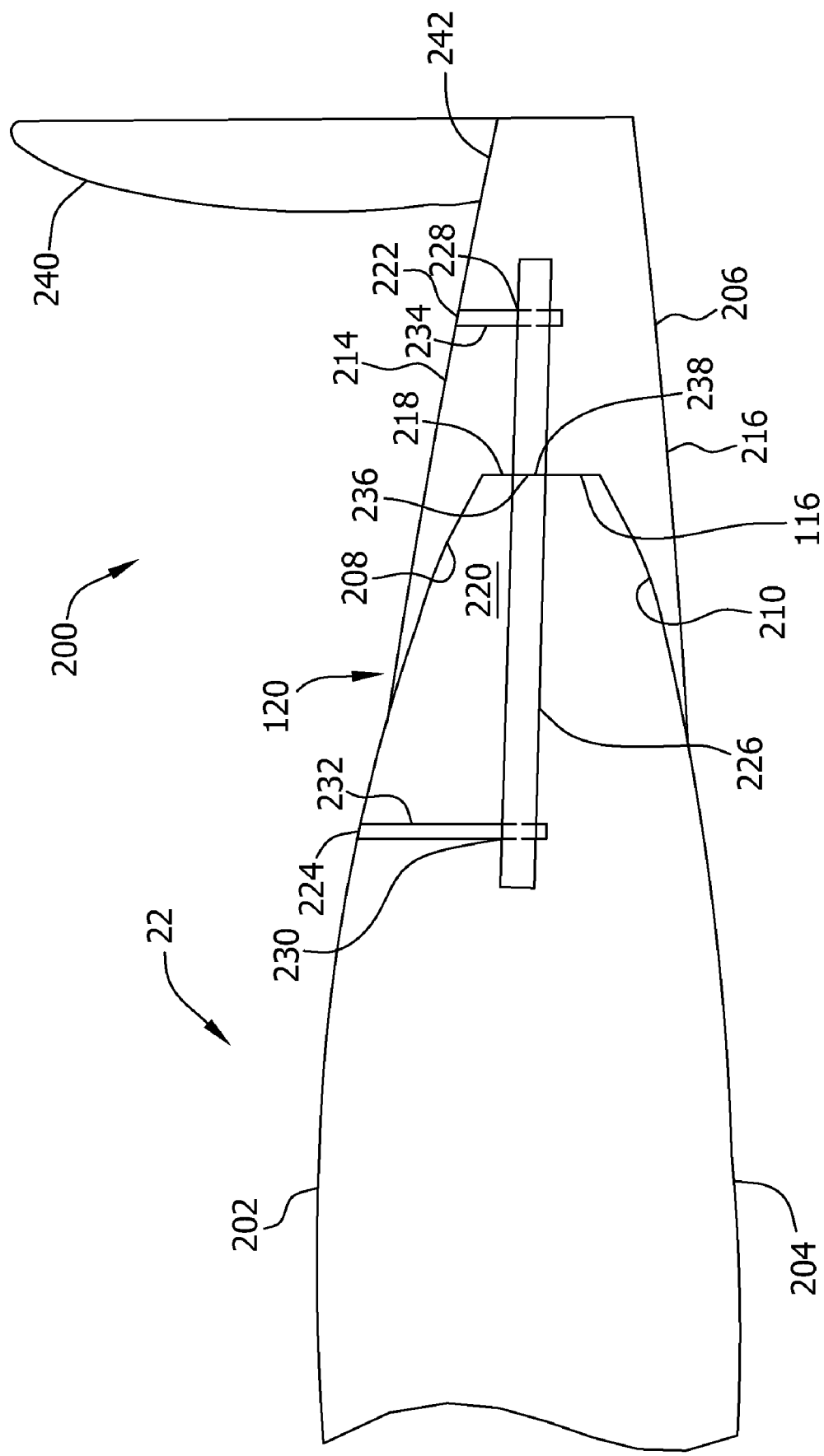

FIG. 5 is a cross-sectional view of an alternative blade extension assembly 200 suitable for use with rotor blade 22. Components shown in FIG. 3 are labeled with similar reference numbers in FIG. 5. In the alternative embodiment, rotor blade 22 includes a pressure side surface 202 and an opposing suction side surface 204. Tip wall 116 extends between pressure side surface 202 and suction side surface 204. Blade extension assembly 200 includes a base member 206 that includes a pressure side interior surface 208, a suction side interior surface 210, and an inner wall 218. Base member 206 further includes a first outer surface 214 and a second outer surface 216. Pressure side interior surface 208 and suction side interior surface 210 extend outward from inner wall 218 such that interior cavity 220 is defined therein. Inner wall 218 is coupled to pressure side interior surface 208 and suction side interior surface 210. Pressure side interior surface 208 is coupled to suction side interior surface 210. Interior cavity 220 is sized and shaped to receive blade tip portion 120, such that tip wall 116 is positioned at or near inner wall 218, pressure side surface 202 is positioned at or near pressure side interior surface 208, and suction side surface 204 is positioned at or near suction side interior surface 210. In the alternative embodiment, tip wall 116, pressure side surface 202, and suction side surface 204 are in sealing contact with corresponding inner wall 218, pressure side interior surface 208, and suction side interior surface 210, respectively.

In the alternative embodiment, base member 206 includes a plurality of openings 222 and rotor blade 22 includes a plurality of openings 224. Support rods 226 extend outward from base member 206 to blade tip portion 120, such that support rods 226 extend between base member openings 222 and rotor blade openings 224. Support rods 226 include a base opening 228 and a tip opening 230. Support rods 226 are positioned such that base opening 228 is concentrically aligned with base member openings 222, and tip opening 230 is concentrically aligned with rotor blade openings 224. A blade shear pin 232 is inserted through rotor blade openings 224 and through tip opening 230, extending at least partially through first sidewall 102 and support rods 226, such that rotor blade 22 is coupled to support rods 226. A base member shear pin 234 is inserted through base member opening 222 and through support rod base opening 228 at least partially extending through a first outer surface 214 and support rods 226 such that rotor blade 22 is coupled to base member 206. Tip wall 116 includes a plurality of slots 236. Inner wall 218 includes a corresponding plurality of slots 238. Slots 236 and 238 are sized and shaped to receive support rods 226. In the alternative embodiment, support rods 226 are rectangular-shaped, however, support rods 226 may have any shape to enable rotor blade 22 to function as described herein. In a further embodiment, blade extension assembly 200 includes a winglet 240 coupled to base member 206. Winglet 240 is positioned near a tip end 242 of base member 206 and extends outward from first outer surface 214 and is aligned substantially perpendicular to first outer surface 214. In a further embodiment, winglet 240 is aligned substantially obliquely from first outer surface 214. In another embodiment, winglet 240 extends outward from second outer surface 216. In a further embodiment, winglet 240 is positioned anywhere along base member 206, such that wind turbine 10 functions as described herein.

Base member 206 is coupled to blade tip portion 120 such that pressure side surface 202 and first outer surface 214 are in a mating relationship and such that at least a portion of base member 206 is blended with at least a portion of blade tip portion 120, such that pressure side surface 202 and first outer surface 214 are substantially flush in order to facilitate reduced disturbances of airflow over rotor blade 22 at trailing edge 108. Suction side surface 204 and second outer surface 216 are in a similar mating relationship such that suction side surface 204 and second outer surface 216 are substantially flush.

During rotation of rotor blade 22, blade extension assembly 200 facilitates reducing disturbances of airflow over rotor blade 22 and facilitates reducing separation of airflow from pressure side surface 202 and suction side surface 204. More particularly, the blade extension assembly 200 facilitates reducing turbulence that generates noise at blade tip 26. Moreover, in one embodiment, blade extension assembly 200 modifies the vortices that trail from blade tip portion 120, thereby facilitating reduced levels of vortex turbulent kinetic energy (TKE) and reduced premature separation of airflow from blade tip portion 120. Reducing TKE facilitates reducing pressure fluctuations that generate noise. Reducing vortex wash facilitates reducing high efficiency source noise mechanisms, and eliminating corners facilitates reducing noise generated when air scrubs over sharp edges and facilitates diffusing and scattering acoustic waves to prevent coherent noise radiation produced by flat surfaces.

Figure 6:
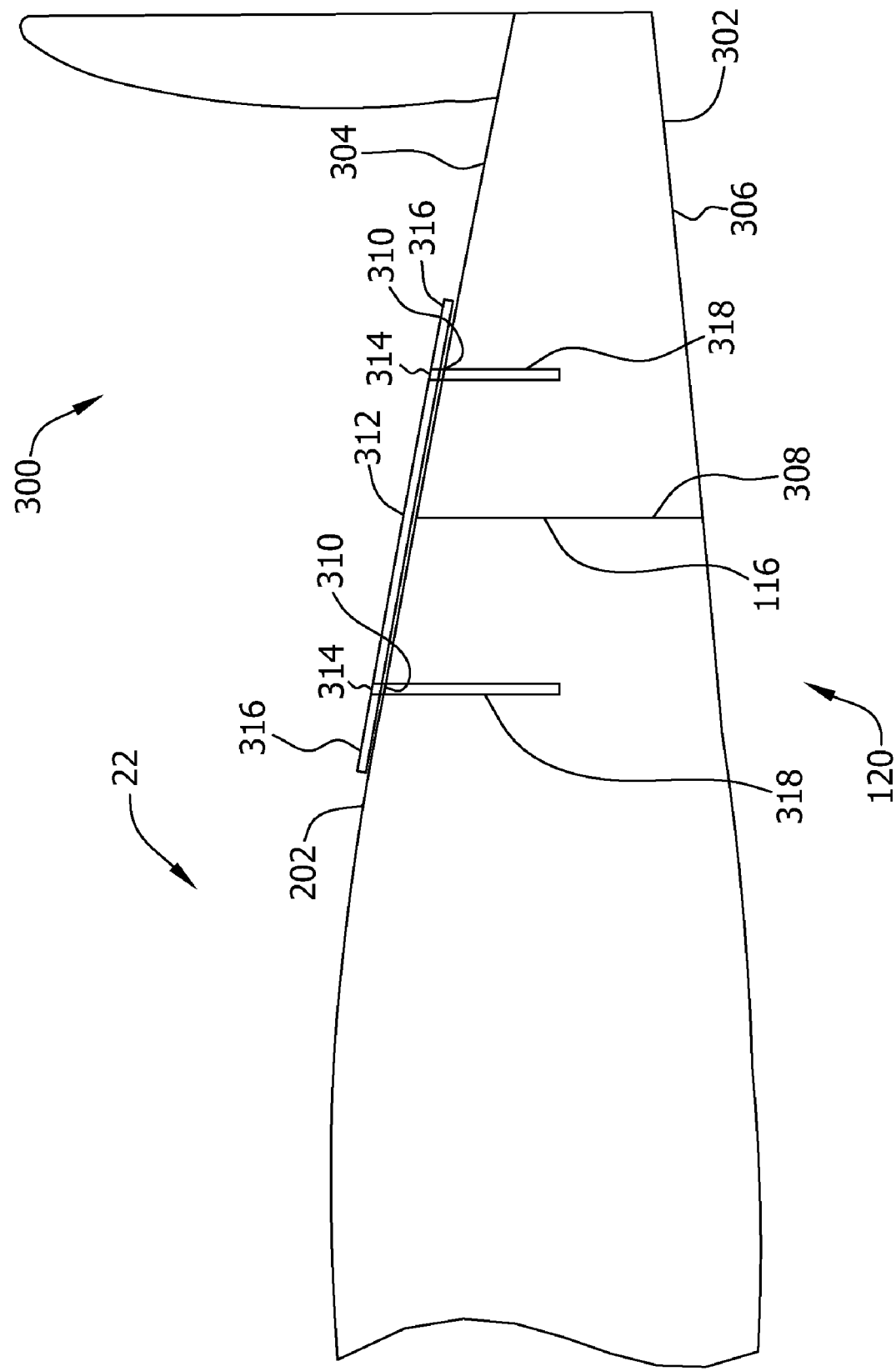

FIG. 6 is a cross-sectional view of an alternative blade extension assembly 300 suitable for use with rotor blade 22. Components shown in FIG. 3 are labeled with similar reference numbers in FIG. 6. In the alternative embodiment, blade extension assembly 300 includes a base member 302 that includes a first outer surface 304, a second outer surface 306, and an outer wall 308. Outer wall 308 extends between first outer surface 304 and second outer surface 306 and is coupled to first outer surface 304 and second outer surface 306. Base member 302 is coupled to rotor blade tip portion 120, such that outer wall 308 is proximate tip wall 116. First outer surface 304 and pressure side surface 202 are in a mating relationship, wherein first outer surface 304 extends substantially tangentially from pressure side surface 202, such that pressure side surface 202 and first outer surface 304 are substantially flush. Second outer surface 306 and suction side surface 204 are in a similar mating relationship, wherein second outer surface 306 extends substantially tangentially from suction side surface 204.

Pressure side surface 202 and first outer surface 304 each include a plurality of openings 310. A plurality of support brackets 312 extend from base member 302 towards blade tip portion 120. Support brackets 312 include openings 314 positioned near outer portions 316 of support brackets 312. Support brackets 312 are positioned such that support bracket openings 314 correspond to openings 310. Openings 310 and 314 are sized and shaped to received a plurality of shear pins 318. Shear pins 318 are inserted through support bracket openings 314 and through openings 310, such that shear pins 318 extend at least partially through support brackets 312, pressure side surface 202, and first outer surface 304. Shear pins 318 are inserted through pressure side surface 202 and support bracket 312, such that rotor blade 22 is coupled to support brackets 312. Shear pins 318 are inserted through base member 302 and support brackets 312 such that rotor blade 22 is coupled to blade extension assembly 300. In an alternative embodiment, support brackets 312 are coupled to suction side surface 204 and second outer surface 306. In a further embodiment, support brackets 312 are coupled to pressure side surface 202, first outer surface 304, suction side surface 204, and second outer surface 306.

FIG. 7 is a flowchart of an exemplary method 400 for assembling blade extension assembly 100. In the exemplary embodiment, method 400 includes on-site assembly of blade extension 100 at the location of wind turbine 10. Method 400 includes removing 402 tip end 118 from blade tip portion 120 of rotor blade 22 and coupling 404 tip wall 116 to blade tip portion 120, such that tip wall 116 extends between first sidewall 102 and second sidewall 104. Blade extension assembly 100 is coupled 406 to blade tip portion 120. In one embodiment, blade extension assembly 100 is coupled 406 to blade tip portion 120 by inserting support rods 138 into cavity 110. In another embodiment, support rods 138 are coupled to blade tip portion 120 with a plurality of shear pins 166 at least partially inserted through the blade tip portion 120 and the support rods 138. In the exemplary embodiment, blade extension assembly 100 is coupled to blade tip portion 120 uptower with rotor blade 22 coupled to hub 20. During assembly, rotor blade 22 is accessible using a man-basket, a crane, a ladder, or any suitable means of accessing rotor blade 22 with rotor blade 22 coupled to wind turbine 10. In an alternative embodiment, blade extension assembly 100 is coupled to rotor blade 22 with rotor blade 22 not coupled to wind turbine 10. Winglet 240 is optionally coupled 408 to base member 136, wherein winglet 240 extends substantially perpendicularly outward from base member 136.

The above-described systems and methods facilitate an increase in the power production of an existing wind turbine, and facilitate a reduction in the generation of acoustic noise during operating of the existing wind turbine. More specifically, the blade extension assembly coupled to an existing rotor blade facilitates an increase in the rotor blade length and surface area, thereby facilitating an increase in the power production of the wind turbine. In addition, the blade extension facilitates modifying the vortices that trail from the rotor blade, thereby facilitating reduced pressure fluctuations across a rotor blade surface that generate noise. The ability to retrofit existing rotor blades to facilitate an increase in the power production of a wind turbine eliminates the need to replace the rotor blade in an effort to increase power production. As such, the cost of upgrading a wind turbine to increase power generation is significantly reduced. Reducing such costs extends the operational life expectancies of wind turbine rotor blades.

Exemplary embodiments of systems and methods for assembling a rotor blade extension for use in a wind turbine are described above in detail. The systems and methods are not limited to the specific embodiments described herein, but rather, components of systems and/or steps of the methods may be utilized independently and separately from other components and/or steps described herein. For example, the methods may also be used in combination with other rotor blade improvement systems and methods, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a blade extension assembly for use with a wind turbine, wherein the wind turbine includes a rotor blade and a hub, said method comprising:
removing a tip end from a tip portion of the rotor blade;
coupling a tip wall to the tip portion, the tip wall extending between a first sidewall and a second sidewall, the tip wall including a plurality of slots defined therein; and,
coupling a blade extension assembly to the rotor blade tip portion, the blade extension assembly comprising:
a plurality of support rods extending towards the tip portion, the plurality of support rods coupled to the tip portion;
a plurality of openings extending through the support rods; and,
a plurality of shear pins inserted at least partially through the first sidewall and the support rod openings.

2. A method in accordance with claim 1, wherein the blade extension assembly comprises a base member and the plurality of support rods extending outward from the base member, said method further comprises:
inserting the support rods through the tip wall and into a cavity defined within the tip portion; and,
coupling the support rods to the tip portion.

3. A method in accordance with claim 1, wherein the blade extension assembly comprises a base member and a plurality of support brackets extending outward from the base member, said method further comprises coupling at least one of the plurality of support brackets to a blade outer surface of the rotor blade and to the base member.

4. A method in accordance with claim 1, further comprising coupling a winglet to the blade extension assembly, such that the winglet extends substantially perpendicularly outward from the blade extension assembly.

5. A blade extension assembly for use in a wind turbine, said blade extension assembly comprising:
a tip wall adapted to be coupled to a tip portion of a rotor blade, the tip portion comprising a blade outer surface comprising a plurality of openings extending therethrough;
a base member adapted to be coupled to the tip portion; and,
a plurality of support rods coupled to and extending from said base member towards the tip portion, said plurality of support rods coupled to the tip portion and comprising a plurality of openings and comprising a plurality of shear pins inserted at least partially through said blade outer surface openings and said support rod openings.

6. A blade extension assembly in accordance with claim 5, wherein said tip wall comprises a plurality of slots sized to receive said support rods.

7. A blade extension assembly in accordance with claim 5, further comprising:
a forward support rod inserted through a forward slot at least partially defined by said tip wall, said forward support rod positioned in a forward cavity of said rotor blade; and,
an aft support rod inserted through an aft slot at least partially defined by said tip wall, said aft support rod positioned in an aft cavity of said rotor blade.

8. A blade extension assembly in accordance with claim 5, further comprising a plurality of openings extending through said base member, said support rods coupled to said base member with a plurality of shear pins inserted through said openings.

9. A blade extension assembly in accordance with claim 5, wherein said base member comprises an inner wall coupled to an interior surface, such that a cavity is defined therebetween, said cavity sized to receive said tip portion, such that said interior surface is in sealing contact with said rotor blade outer surface.

10. A blade extension assembly in accordance with claim 5, wherein said plurality of support rods comprises at least one support bracket extending from said base member towards said tip portion, said support bracket coupled to said blade outer surface and said base member with said plurality of shear pins.

11. A blade extension assembly in accordance with claim 5, further comprising a winglet coupled to said base member, said winglet extending substantially perpendicularly outward from a tip end of said base member.

12. A wind turbine, comprising:
a tower;
a nacelle coupled to said tower;
a hub rotatably coupled to said nacelle;
at least one rotor blade coupled to said hub, said rotor blade comprising a tip portion and a blade outer surface; and,
a blade extension assembly coupled to said rotor blade, said blade extension assembly comprising:
a tip wall coupled to said tip portion;
a base member coupled to said tip portion and comprising a plurality of openings extending therethrough; and,
a plurality of support rods coupled to and extending from said base member towards said tip portion, said plurality of support rods coupled to said base member and comprising a plurality of shear pins inserted at least partially through the blade outer surface openings and said support rod openings.

13. A wind turbine according to claim 12, wherein said tip wall comprises a plurality of slots sized to receive said support rods therein.

14. A wind turbine according to claim 12, wherein said plurality of support rods comprises a plurality of openings defined through a tip end, said rotor blade comprising a plurality of openings extending through said blade outer surface, said shear pins inserted at least partially through said blade outer surface openings and said support rod openings.

15. A wind turbine according to claim 12, wherein said base member comprises an inner wall coupled to an interior surface such that a cavity is defined therebetween, said cavity sized to receive said rotor blade tip portion, such that said interior surface is in sealing contact with said rotor blade outer surface.

16. A wind turbine according to claim 12, wherein said blade extension assembly further comprises a winglet coupled to said base member, said winglet extending substantially perpendicularly outward from a tip end of said base member.

17. A rotor blade for use with a wind turbine, said rotor comprising:
a tip portion; and,
a blade extension assembly coupled to said tip portion, said blade extension assembly comprising:
a tip wall coupled to said tip portion;
a base member coupled to said tip portion; and,
a plurality of support rods coupled to and extending from said base member towards said tip portion, said plurality of support rods coupled to said tip portion, said plurality of support rods comprises at least one support bracket extending from said base member towards said tip portion, said support bracket coupled to said tip portion and said base member by a plurality of shear pins.

* * * * *